(12) United States Patent
Coulson et al.

(10) Patent No.: US 10,126,883 B2
(45) Date of Patent: Nov. 13, 2018

(54) CAPACITIVE TOUCH PANEL WITH HEIGHT DETERMINATION FUNCTION

(75) Inventors: Michael Paul Coulson, Oxford (GB); Christopher James Brown, Oxford (GB); Dauren Slamkul, Oxford (GB)

(73) Assignee: SHARP KABUSHIKI KAISHA, Osaka (JP)

( * ) Notice: Subject to any disclaimer, the term of this patent is extended or adjusted under 35 U.S.C. 154(b) by 552 days.

(21) Appl. No.: 13/541,423

(22) Filed: Jul. 3, 2012

(65) Prior Publication Data

US 2014/0009428 A1    Jan. 9, 2014

(51) Int. Cl.
*G06F 3/044*    (2006.01)

(52) U.S. Cl.
CPC .... *G06F 3/044* (2013.01); *G06F 2203/04101* (2013.01)

(58) Field of Classification Search
CPC .................. G06F 3/044; G06F 3/0416; G06F 2203/04101
USPC ................................................ 345/173–178
See application file for complete search history.

(56) References Cited

U.S. PATENT DOCUMENTS

| 4,293,734 | A | 10/1981 | Pepper |
| 7,098,673 | B2 | 8/2006 | Launay |
| 7,663,607 | B2 | 2/2010 | Hotelling |
| 2007/0074914 | A1* | 4/2007 | Geaghan et al. .......... 178/18.06 |
| 2008/0012835 | A1* | 1/2008 | Rimon .................... G06F 3/038 345/173 |
| 2009/0309851 | A1* | 12/2009 | Bernstein .............. G06F 3/0416 345/174 |
| 2011/0007021 | A1* | 1/2011 | Bernstein et al. ............ 345/174 |
| 2011/0007030 | A1* | 1/2011 | Mo et al. ....................... 345/174 |
| 2011/0148785 | A1* | 6/2011 | Oda ..................... G06F 3/03545 345/173 |
| 2011/0267310 | A1* | 11/2011 | Tsukahara ............. G06F 3/0416 345/174 |
| 2012/0133614 | A1* | 5/2012 | Bytheway ............... G06F 3/044 345/174 |

(Continued)

FOREIGN PATENT DOCUMENTS

CN            102221945      10/2011

OTHER PUBLICATIONS

Van Berkel and Lionheart; "Reconstruction of a grounded object in an electrostatic halfspace with an indicator function"; Inverse Problems in Science and Engineering, vol. 15, No. 6; Sep. 2007.

*Primary Examiner* — Amare Mengistu
*Assistant Examiner* — Sarvesh J Nadkarni
(74) *Attorney, Agent, or Firm* — Renner Otto Boisselle and Sklar

(57) ABSTRACT

A capacitive touch sensor includes a sensor substrate and an array of electrode elements formed over the sensor substrate. Each electrode element of the array includes at least one of a first electrode group comprising at least two drive electrodes and at least one sense electrode, or a second electrode group comprising at least two sense electrodes and at least one drive electrode. The respective electrodes of the first or second electrode group are arranged to form multiple capacitances over different coupling distances. A controller is operatively coupled to the array of electrode elements, the controller configured to determine a distance of an object relative to the surface of the touch sensor based on variations in the multiple capacitances.

29 Claims, 21 Drawing Sheets

(56) References Cited

U.S. PATENT DOCUMENTS

2012/0154324 A1* 6/2012 Wright .................. G06F 3/0416
345/174

\* cited by examiner

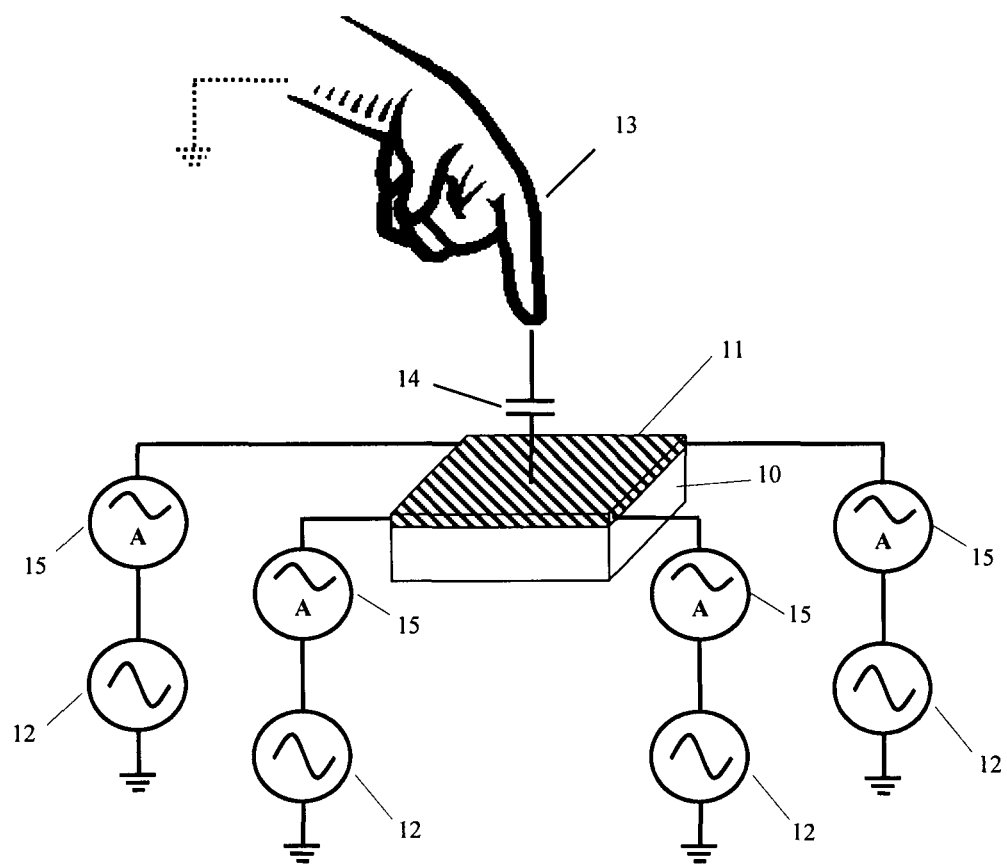
FIG 1
(Conventional)

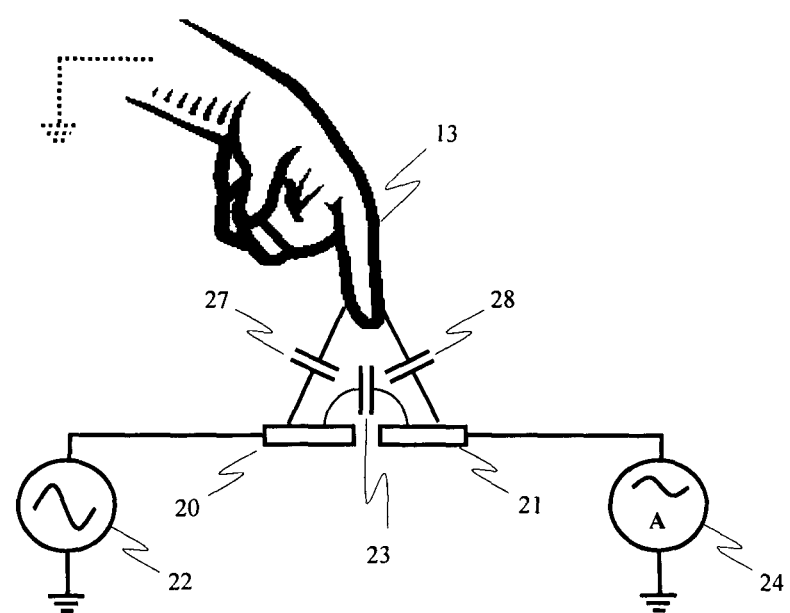
FIG 2
(Conventional)

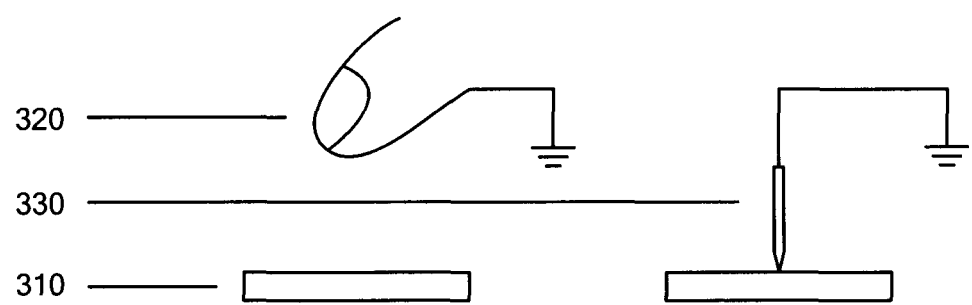
FIG 3
(Conventional)

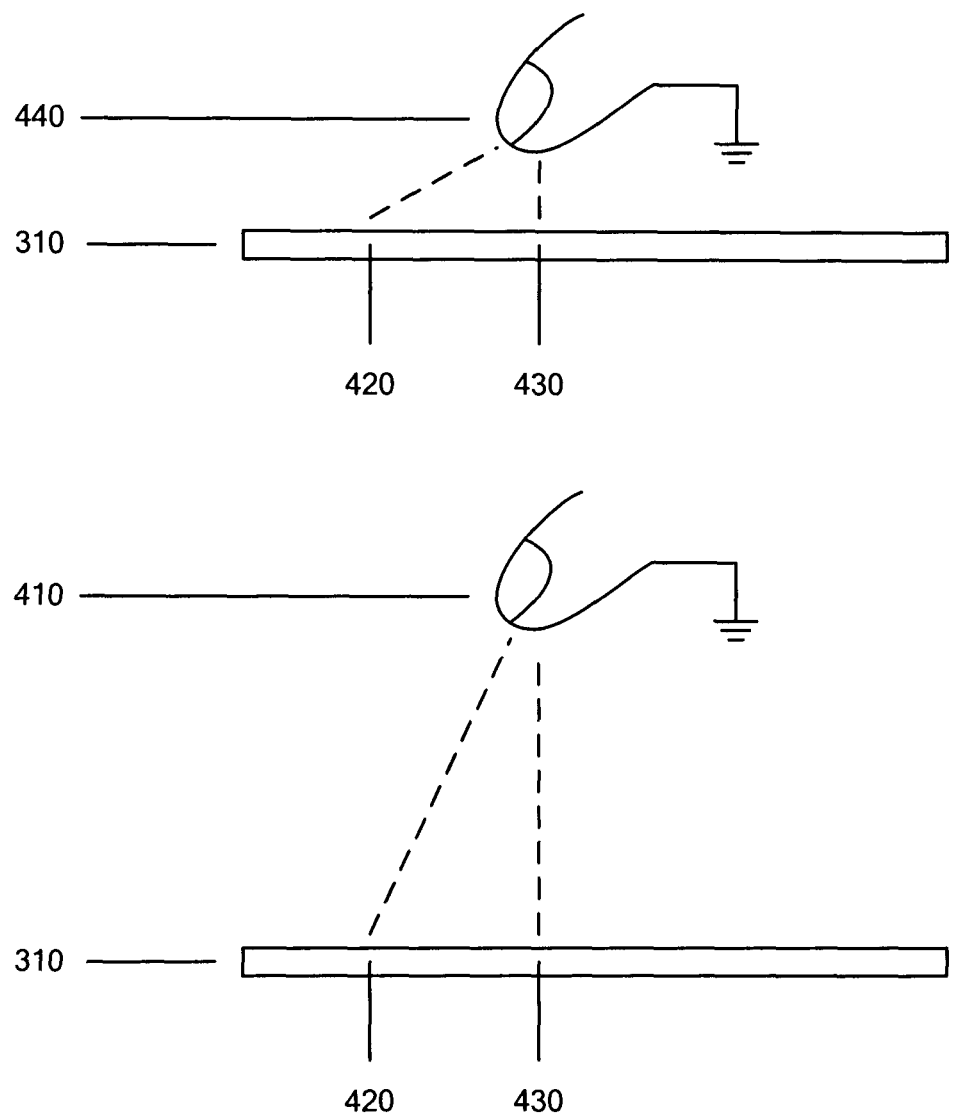
FIG 4
(Conventional)

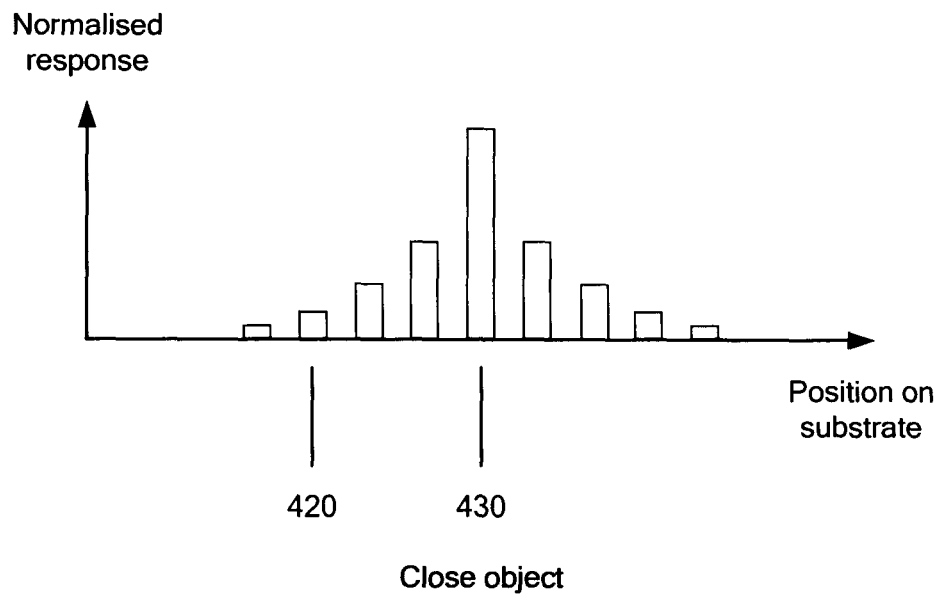
Close object
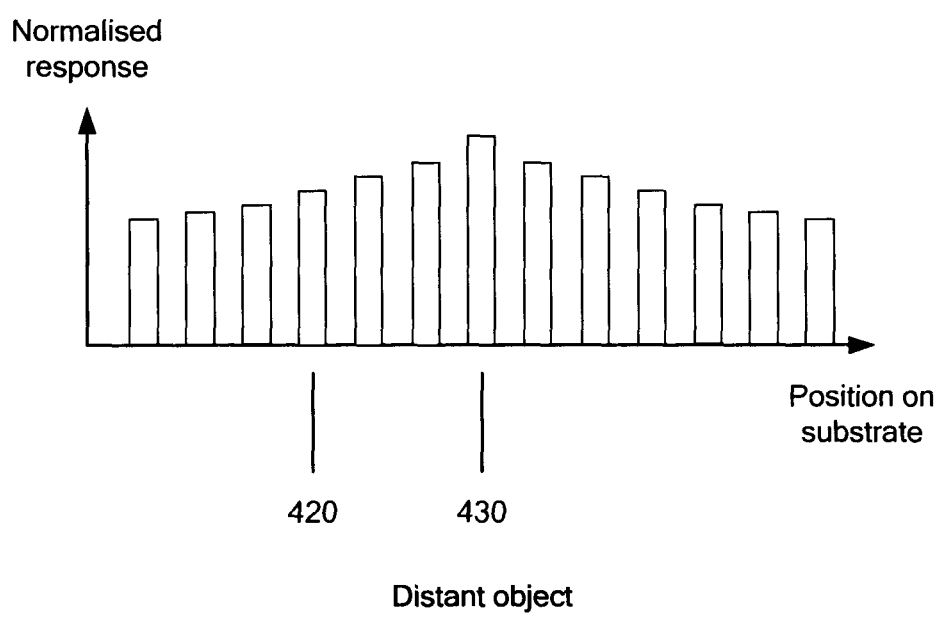
Distant object
FIG 5
(Conventional)

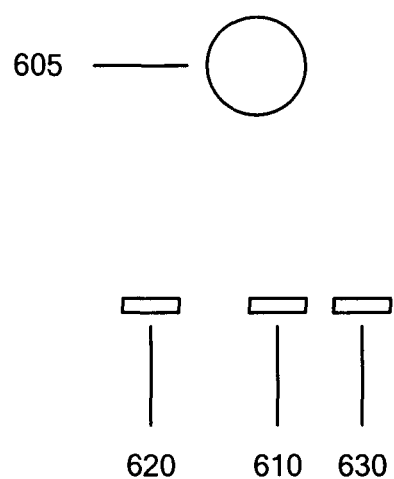
FIG 6
(Conventional)

CAPACITIVE TOUCH PANEL WITH HEIGHT DETERMINATION FUNCTION

TECHNICAL FIELD AND APPLICATIONS OF THE INVENTION

The present invention relates to touch panel devices. In particular, this invention relates to capacitive type touch panels. Such a capacitive type touch panel device may find application in a range of consumer electronic products including, for example, mobile phones, tablet and desktop PCs, electronic book readers and digital signage products.

BACKGROUND ART

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is the surface capacitive method (also known as self-capacitance), for example as disclosed in U.S. Pat. No. 4,293,734 (Pepper, Oct. 6, 1981). A typical implementation of a surface capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electrostatic field above the substrate. When a conductive object, such as a human finger 13, comes into close proximity to the sensing electrode, a capacitor 14 is dynamically formed between the sensing electrode 11 and the finger 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels is the projected capacitive method (also known as mutual capacitance). In this method, as shown in FIG. 2, a drive electrode 20 and sense electrode 21 are formed on a transparent substrate (not shown). The drive electrode 20 is fed with a changing voltage or excitation signal by a voltage source 22. A signal is then induced on the adjacent sense electrode 21 by means of capacitive coupling via the mutual coupling capacitor 23 formed between the drive electrode 20 and sense electrode 21. A current measurement means 24 is connected to the sense electrode 21 and provides a measurement of the size of the mutual coupling capacitor 23. When a conductive object such as a finger 13 is brought to close proximity to both electrodes, it forms a first dynamic capacitor to the drive electrode 27 and a second dynamic capacitor to the sense electrode 28. The effect of these dynamically formed capacitances is manifested as a reduction of the amount of capacitive coupling in between the drive and sense electrodes and hence a reduction in the magnitude of the signal measured by the current measurement means 24 attached to the sense electrode 21. As is well-known and disclosed, for example in U.S. Pat. No. 7,663,607 (Hotelling, Feb. 6, 2010), by arranging a plurality of drive and sense electrodes in a grid, this projected capacitance sensing method may be used to form a touch panel device. An advantage of the projected capacitance sensing method over the surface capacitance method is that multiple simultaneous touch input events may be detected.

If the sensitivity of the projected capacitive touch sensor is sufficiently high, objects may be detected at some distance from the sensor substrate. In principle, this capability can be used to add new functions to a user interface. For example, specific action may be implemented when an object (such as a stylus or a finger) is held just above a point on the touch sensor. For example, the finger may cause an item in the user interface over which the object is located to be pre-selected, highlighted or the like. For reliable operation, the touch sensor must calculate height accurately enough to distinguish between objects that touch the sensor substrate, and objects that are held in close proximity to the substrate. Equally, the touch sensor and controller circuitry may be designed to recognise complex gestures made by the user in the 3D space above the sensor substrate. This requires the touch sensor to accurately calculate the heights of multiple objects.

The simplest way of determining object height is to examine the magnitude of the change in capacitance detected by the touch panel. However, FIG. 3 illustrates two cases that may typically cause unreliable operation. For example, in a first case, a given capacitance change may be caused by a large object 320 at some distance from the touch panel 310 whilst in a second case a similar change in capacitance may be caused by a small object 330 at a second closer distance from the sensor. It is therefore not possible to determine object height by examining the magnitude of the capacitance change alone. Further, the change in capacitance will also be influenced by the conductivity of the object, and by the resistance of its path to ground, both of which are typically unknown.

Another way of determining object height is 'triangulation', which involves combining proximity readings from multiple positions on the touch panel 310 (more specifically the intersections of the drive electrodes and the sense electrodes). This principle is illustrated in FIG. 4. A distant object 410 will cause a similar change in capacitance to be measured at the different positions 420 and 430. Conversely, a close object 440 will cause a much greater change in capacitance to be measured at position 430, directly beneath the close object 440, than at position 420. By examining the normalised distribution of the measured capacitance change with distance across the sensor substrate, as shown in FIG. 5, the height of the object may be inferred independently of the absolute capacitance changes. The measure is therefore independent of the object's conductivity and resistance to ground. However, using this method it can still be difficult to separate the object's size from its height. This is because a large object in close proximity, and a small object at a distance, will each produce a similarly uniform distribution of capacitance change across the substrate.

Similarly, the calculation becomes complex when the position of multiple objects must be determined, at some distance above the sensor substrate. Computationally intensive methods are then required, such as those proposed by Van Berkel and Lionheart ("Reconstruction of a grounded object in an electrostatic halfspace with an indicator function", Inverse Problems in Science and Engineering, Vol. 15, No. 6, September 2007).

Finally, if the object is small and in close proximity, its influence may become localised to the one intersection directly beneath it. This means that the height determination algorithm becomes ill-conditioned when determining whether actual contact has been made with the touch sensor substrate.

FIG. 6 shows another way of determining the height of an object 605, which involves comparing two projected capacitance measurements taken from approximately the same point, but using different electrode geometries. For example, U.S. Pat. No. 7,098,673 (Launay, Aug. 29, 2006) describes adding an 'auxiliary measurement electrode' 610 between the parallel drive electrode 620 and sense electrode 630 of a discrete capacitive sensor. However, this method may not be applied to projected capacitance sensor matrices such as those used in touch panels.

Accordingly, there exists no satisfactory means of reliably determining an object's height using a projected capacitance sensor. As described above known schemes are either ill-conditioned, computationally intensive, or do not apply to projected capacitance sensor matrices.

SUMMARY OF THE INVENTION

The capacitive touch panel of the present invention provides a means of accurately and reliably detecting the height of an object above the surface of a touch panel. The touch panel includes an electrode array comprising a plurality of drive and sense electrodes. The sense electrodes or the drive electrodes may be arranged as pairs such that two sense electrodes (or drive electrodes) are provided at every intersection in the array. The electrodes are further arranged such that, for example, a first sense electrode of a sense electrode pair is separated from a drive electrode by a shorter distance, in the plane of the sensor substrate, than a second sense electrode of the sense electrode pair.

Since the first sense electrode is closer to the drive electrodes at any given intersection of drive electrode and sense electrode pair, most of the capacitive coupling between this electrode and the drive electrode happens close to the substrate. The response of the first sense electrode is therefore most heavily weighted towards objects in very close proximity to the sensor. For the second sense electrode, which is more distant from the drive electrode, the coupling is less concentrated at the surface of the sensor substrate. The response of the second sense electrode is therefore less heavily weighted towards objects in contact with the sensor substrate. By comparing measurement results from first and second sense electrodes it is possible to determine the height of an object independently of its size, conductivity and resistance to ground.

This approach is advantageous over the prior art because it is applicable to projected capacitance sensor matrices, such as those used in the touch screens of mobile telephones. It is advantageous over 'triangulation', where the response magnitude from different intersections is compared, because the new method is simpler and requires measurements from one intersection only.

According to one aspect of the invention, a capacitive touch sensor includes: a sensor substrate; an array of electrode elements formed over the sensor substrate, each electrode element of the array including at least one of a first electrode group comprising at least two drive electrodes and at least one sense electrode, or a second electrode group comprising at least two sense electrodes and at least one drive electrode, wherein the respective electrodes of the first or second electrode group are arranged to form multiple capacitances over different coupling distances; and a controller operatively coupled to the array of electrode elements, the controller configured to determine a distance of an object relative to the surface of the touch sensor based on variations in the multiple capacitances.

According to one aspect of the invention, the electrode elements of the array comprise the second electrode group, and within the second electrode group a first sense electrode of the at least two sense electrodes is separated from the at least one drive electrode by a shorter distance, in a plane of the sensor substrate, than a second sense electrode of the at least two sense electrodes.

According to one aspect of the invention, the first and second sense electrodes are arranged symmetrically.

According to one aspect of the invention, the second sense electrode is patterned into interconnected diamonds, and the first sense electrode is split into a first part and a second part, the first and second parts arranged on respective sides of the second sense electrode such that the first sense electrode is closer to the at least one drive electrode than the second sense electrode.

According to one aspect of the invention, the first part and the second part are electrically connected to each other.

According to one aspect of the invention, the first sense electrode forms a first mutual coupling capacitance with the at least one drive electrode and the second sense electrode forms a second mutual coupling capacitance with the at least one drive electrode.

According to one aspect of the invention, the controller is configured to calculate a distance of an object relative to a planar surface of the touch panel based on a ratio of the changes in the drive to sense capacitances.

According to one aspect of the invention, the electrode elements of the array comprise the first electrode group, and within the first electrode group a first drive electrode of the at least two drive electrodes is separated from the at least one sense electrode by a shorter distance, in a plane of the sensor substrate, than a second drive electrode of the at least two drive electrodes.

According to one aspect of the invention, the at least two drive electrodes are arranged symmetrically.

According to one aspect of the invention, the second drive electrode is patterned into interconnected diamonds, and the first drive electrode is split into a first part and a second part, the first part arranged on each side of the second drive electrode such that the first part is closer to the at least one sense electrode than the second drive electrode.

According to one aspect of the invention, the first drive electrode forms a first mutual coupling capacitance with the at least one sense electrode and the second drive electrode forms a second mutual coupling capacitance with the at least one sense electrode.

According to one aspect of the invention, the first or second electrode group includes at least two drive electrodes arranged as drive electrode pairs and at least two sense electrodes arranged as sense electrode pairs, and wherein one drive electrode of the drive electrode pair is split into first and second drive electrode parts and one sense electrode of the sense electrode pair is split into first and second sense electrode parts, and the first drive electrode part is positioned adjacent to the first sense electrode part in a plane of the sensor substrate, and the first drive electrode part and the first sense electrode part are arranged between the second drive electrode part and the second sense electrode part.

According to one aspect of the invention, a majority of the first sense electrode is separated from a first drive electrode of the respective electrode element by a shorter distance, in a plane of the sensor substrate, than the second sense electrode of the respective electrode element, and a majority of the second sense electrode is separated from a second drive electrode of an adjacent electrode element by a shorter distance, in a plane of the sensor substrate, than the first sense electrode.

According to one aspect of the invention, the drive electrodes are interdigitated with the sense electrodes.

According to one aspect of the invention, the controller is configured to access a look-up table corresponding to each electrode element in order to determine a position and distance of an object relative to the touch panel.

According to one aspect of the invention, the first or second electrode group comprises three or more sense electrodes.

According to one aspect of the invention, a capacitive touch panel system includes a liquid crystal display, and a touch sensor as described herein mounted to the liquid crystal display.

According to one aspect of the invention, the controller is configured to: provide a time varying voltage stimulus to the drive electrodes; and measure a charge that flows from the sense electrodes in response to the time varying voltage stimulus.

According to one aspect of the invention, the controller is further configured to determine a position and height of an object above the touch sensor based on the measured charge.

According to one aspect of the invention, the controller is configured to: perform a first measurement phase wherein a charge is measured that flows from each sense electrode in response to the first drive electrode being provided with a changing electric potential while the second drive electrode is held at a constant electric potential; perform a second measurement phase wherein a charge is measured that flows from each sense electrode in response to the second drive electrode being provided with a changing electric potential while the first drive electrode is held at a constant electric potential; and determine a position and distance of an object from the touch panel based on the measured charge obtained in the first and second measurement phases.

According to one aspect of the invention, the controller is configured to: perform a first measurement phase wherein a charge is measured that flows from each sense electrode in response to a positive voltage change provided to both the first drive electrode and the second drive electrode; perform a second measurement phase wherein a charge is measured that flows from each sense electrode in response to a positive voltage change provided to the first drive electrode, while a negative voltage change is provided to the second drive electrode; and determine a position and distance of an object from the touch panel based on the measured charge obtained in the first and second measurement phases.

According to one aspect of the invention, the controller is configured to: perform a first measurement phase wherein a charge is measured that flows from the first sense electrode and from the second sense electrode in response to a voltage stimulus applied to the first drive electrode while the second drive electrode is held at a constant electric potential; perform a second measurement phase wherein a charge is measured that flows from the first sense electrode and the second sense electrode in response to a voltage stimulus applied to the second drive electrode while the first drive electrode is held at a constant electric potential; determine a position and distance of an object from the touch panel based on the measured charge of the first and second sense electrodes obtained in the first and second measurement phases.

According to one aspect of the invention, the controller is configured to: perform a first measurement phase wherein a charge is measured that flows from the first sense electrode and from the second sense electrode in response to a positive change in electric potential applied to the first drive electrode and a negative change in electric potential is applied to the second drive electrode; determine a position and distance of an object from the touch panel based on the measured charge of the first and second sense electrodes.

According to one aspect of the invention, the controller is configured to: determine a first capacitance between the drive electrode and a first sense electrode of the three sense electrodes; determine a second capacitance between the drive electrode and a second sense electrode of the three sense electrodes; determine a third capacitance between the drive electrode and a third sense electrode of the three sense electrodes; determine the ratio of the change in the second capacitance to the change in the first capacitance; determine the ratio of the change in the third capacitance to the change in the first capacitance; compare the ratios to data stored in a lookup table; and determine a position and distance of an object from the touch panel based on the comparison.

According to one aspect of the invention, the controller is configured to determine a position and distance of an object from the touch panel based on a ratio of measured capacitance between the drive and sense electrodes.

According to one aspect of the invention, the controller is configured to determine a position and distance of an object from the touch panel based on a difference in measured capacitance between the drive and sense electrodes.

According to one aspect of the invention, the controller is further configured to apply a weight factor to at least one measured capacitance prior to determining the difference in capacitance.

According to one aspect of the invention, the controller is configured to: perform a first measurement phase wherein a charge is measured that flows from the first sense electrode and from the second sense electrode in response to a voltage stimulus applied to the first drive electrode while the second drive electrode is held at a constant electric potential; perform a second measurement phase wherein a charge is measured that flows from the first sense electrode and the second sense electrode in response to a voltage stimulus applied to the second drive electrode while the first drive electrode is held at a constant electric potential; determine a position and distance of an object from the touch panel based on a weighted summation of the measured charge of the first and second sense electrodes obtained in the first and second measurement phases.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 shows a typical implementation of a conventional surface capacitance type touch panel.

FIG. 2 shows a typical implementation of a conventional projected capacitance type touch panel.

FIG. 3 shows a large object at a distance from a touch panel, and a small object in close proximity to a touch panel.

FIG. 4 shows the principle of triangulation, used to determine object height.

FIG. 5 shows an example response from a nearby and a distant object, vs. substrate position.

FIG. 6 shows a conventional means of determining object height.

DESCRIPTION OF REFERENCE NUMERALS

Figure 7:
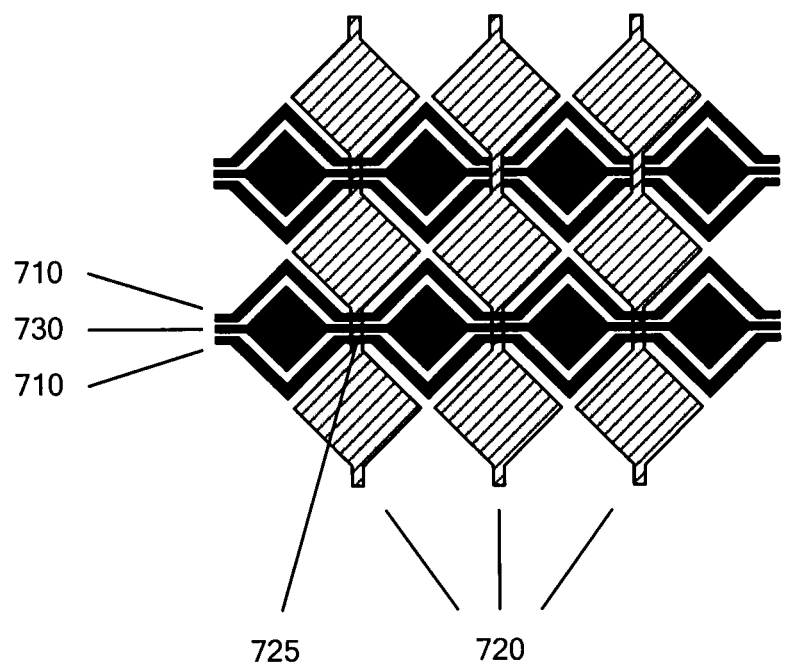
FIG. 7 shows a plan view of one example electrode geometry that is compatible with the present invention.

10 Transparent substrate
11 Sensing electrode
12 Voltage source
13 Conductive object
14 Capacitor
15 Current sensor
20 Drive electrode
21 Sense electrode
22 Voltage source
23 Mutual coupling capacitor
24 Current measurement means
27 Drive electrode
28 Sense electrode
310 Touch panel
320 Large object
330 Small object
410 Distant object
420 First position
430 Second position
440 Close object
605 Object
610 Auxiliary measurement electrode
620 Parallel drive electrode
630 Parallel sense electrode
710 Sense electrode A
720 Drive electrodes
725 Intersection
730 Sense electrode B
810 Substrate
820 First conductive layer
830 Drive electrodes
840 Sense electrodes
850 Second conductive layer
860 Insulating layer
870 Locations where contact to first conductive layer is intended
910 Sensor
920 Liquid crystal display device
930 Controller circuit
940 Host electronics
1010 Active drive electrode
1020 Inactive drive electrode
1030 Grounded conductive object
1040 Fringing fields
1050 Fringing fields
1150 Sense electrodes
1160 Drive electrode B
1170 Drive electrode A
1210 Drive electrode A
1220 Drive electrode B
1410 Sense electrode A
1420 Odd numbered drive electrodes
1430 Sense electrode B
1440 Even numbered drive electrodes
1510 Drive electrodes
1520 Sense electrodes
1610 Sense electrode A
1620 Sense electrode B
1710 First diamond shaped sense electrode
1720 Second electrode track
1730 Third electrode track
2210 Common electrode

DETAILED DESCRIPTION OF INVENTION

The present invention provides a capacitive touch sensor that may be used, for example for touch panel display systems or the like. The touch sensor includes a sensor substrate, and an array of electrode elements formed over the sensor substrate. Each electrode element of the array includes at least one of a first electrode group comprising at least two drive electrodes and at least one sense electrode, or a second electrode group comprising at least two sense electrodes and at least one drive electrode. The respective electrodes of the first or second electrode group are arranged to form multiple capacitances over different coupling distances. In this manner, the multiple coupling capacitances can be used in combination to determine proximity of an object. For example, a controller can be operatively coupled to the array of electrode elements and configured to determine a distance of an object relative to the surface of the touch sensor based on variations in the multiple capacitances.

In accordance with a first and most general embodiment of the present invention, a capacitive touch panel (also referred to as a touch sensor) is provided with a means of accurately and reliably detecting the height of an object above the surface of the touch panel. The touch panel includes an electrode array comprising a plurality of drive and sense electrodes formed on a sensor substrate. The drive electrodes are excited with a voltage stimulus, either simultaneously or in sequence, and the resulting current that flows from the sense electrodes —due to the mutual coupling capacitance between the drive and sense electrodes—is measured. The sense electrodes may be arranged as pairs such that two sense electrodes are provided at every row-column intersection in the array (e.g., at each row-column intersection there is formed a first electrode group that includes at least two sense electrodes and at least one drive electrode). The electrodes are further arranged such that a first sense electrode of the pair is separated from the drive electrode by a shorter distance, in the plane of the sensor substrate, than a second sense electrode of the pair.

One possible arrangement of the drive and sense electrodes is shown in FIG. 7, where the first sense electrode, sense electrode A 710, and the second sense electrode, sense electrode B 730, are symmetrically arranged at every intersection of the matrix. As used herein, the term "symmetry" refers to symmetry about at least one axis. Sense electrode B 730 is patterned into interconnected diamonds, of the type commonly found in conventional projected capacitance sensor arrays. Sense electrode A 710 is split into two halves, one of which (e.g., a first part) runs on each side of sense electrode B 730 (e.g., a second part), so that sense electrode A is positioned closer to the drive electrodes 720 than sense electrode B is. The two parts of sense electrode A 710 are electrically connected, either within the external controller circuitry, or by fabricating conductive bridges on the sensor substrate. The electrode arrangement may be symmetrical around the centre line of sense electrode B.

Sense electrode A forms a first mutual coupling capacitance CA with the drive electrode and sense electrode B forms a second mutual coupling capacitance CB with the drive electrode. Since sense electrode A 710 lies closer to the drive electrodes, most of the capacitive coupling between the two happens close to the substrate. The response of sense electrode A 710 is therefore most heavily weighted towards objects in very close proximity to the sensor. For sense electrode B 730, which is more distant from the drive electrodes 720, the coupling is less concentrated at the surface of the sensor substrate. The response of sense electrode B 730 is therefore less heavily weighted towards objects close or in contact with the sensor substrate. By comparing measurement results from sense electrodes A and B, it is possible to determine the height of an object independently of its size, conductivity and resistance to ground.

Figure 8:
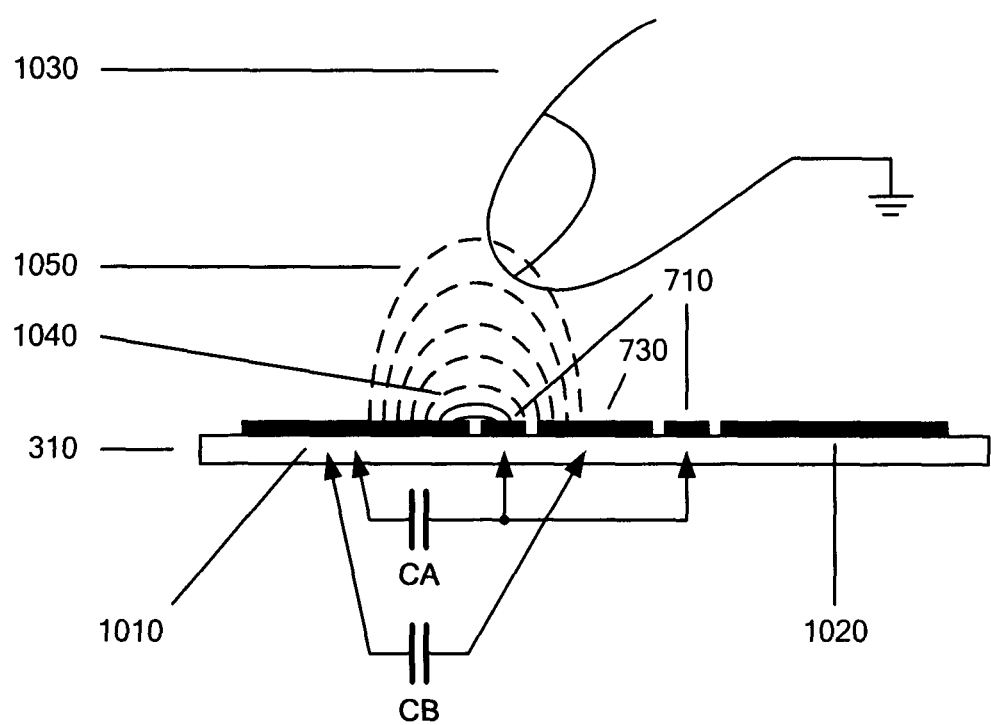
FIG. 8 shows a cross section of an exemplary sensor substrate, according to the present invention, showing electric field lines coupling between drive and sense electrodes.

The theory of operation of this electrode arrangement is illustrated in FIG. 8 which shows a cross-section of the sensor substrate 310, through a drive-sense intersection 725. Sense electrode B 730 is separated, in the plane of the sensor substrate, from the active drive electrode 1010 and the adjacent inactive drive electrode 1020, by the two portions of sense electrode A 710. In operation, a stimulus is applied to an active drive electrode 1010 whilst the adjacent inactive drive electrode 1020 is maintained at a constant voltage. Signals are then generated on sense electrode A and sense electrode B in response to the stimuli through the mutual coupling capacitances, CA and CB.

When a grounded conductive object 1030 is brought towards the intersection of 725 of the drive and sense electrodes, it disrupts the fringing fields 1040 that couple the active drive electrode 1010 to sense electrode A 710, and the fringing fields 1050 that couple the active drive electrode 1010 to sense electrode B 730. This causes the capacitances CA, between the active drive electrode and sense electrode A, and CB, between the active drive electrode and sense electrode B, to fall.

However, as the grounded conductive object 1030 approaches the sensor substrate 310, the capacitance CA will diminish sooner than the capacitance CB. This is because, in the plane of the sensor substrate, sense electrode B 730 is shielded from the drive electrode by sense electrode A 710. As shown in FIG. 8, any electric flux that couples the drive electrode to sense electrode B must pass through the air at some significant distance above the sensor substrate. This flux is interrupted by distant objects, whereas the flux that couples the active drive electrode to sense electrode A is interrupted by closer objects.

Figure 9:
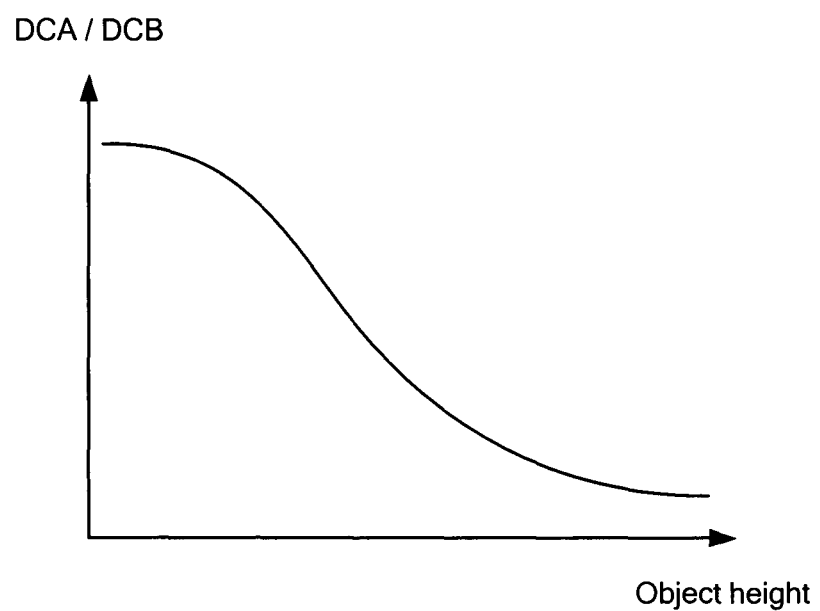
FIG. 9 shows one possible variation of a ratio of measured capacitances with object height above the sensor substrate.

One possible way of calculating the height of an object, from the measured capacitance data, is to examine the ratio of the changes in the drive to sense capacitances CA and CB. The changes are measured with respect to baseline values, which may be obtained during a calibration step performed in the absence of any objects, or which may be obtained by low pass filtering the measured capacitance values. For any given intersection 725, the ratio of CA/CB will vary with object height, yet will be largely independent of object conductivity. The variation of the ratio CA/CB with object height may be characterised and may be approximated by a mathematical function, or stored in a look-up table. A possible variation of the ratio CA/CB with object height is shown in FIG. 9, although the behaviour will depend upon the electrode geometry employed.

Figure 10:
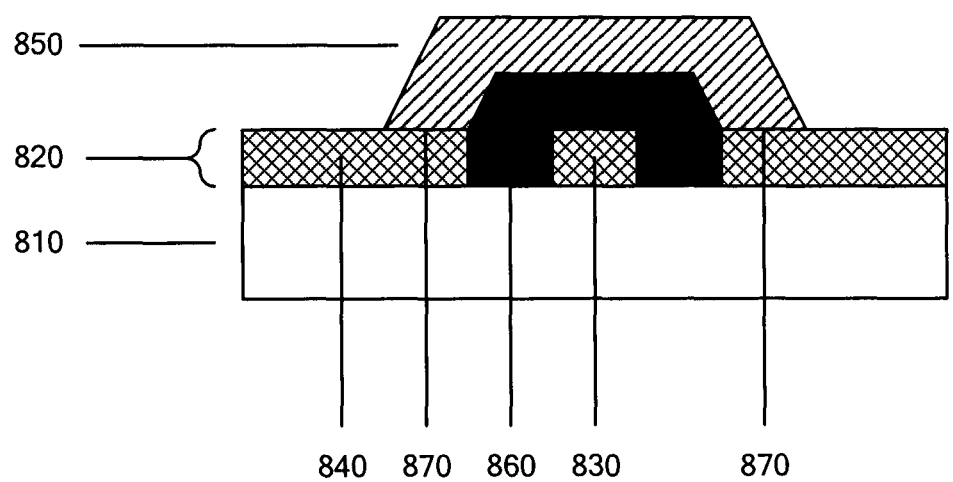
FIG. 10 shows a cross section of an exemplary sensor substrate.

The drive and sense electrodes of the electrode array may be fabricated by conventional photolithographic or printing techniques well-known in the manufacture of, for example, touch panels and liquid crystal displays. As shown in the partial cross section of FIG. 10, the electrodes may be formed on a substrate 810, onto which is deposited a first conductive layer 820. The first conductive layer 820 is patterned into separate drive electrodes 830 and sense electrodes 840. The substrate 810 may be made of a transparent insulating material, such as glass, plastic or the like, whilst the first conductive layer may be formed by a transparent conductive material such as, for example, Indium Tin Oxide (ITO) or Indium Zinc Oxide (IZO). So that the drive and sense electrodes may cross each other without electrical contact, a second conductive layer 850 is deposited. This second conductive layer 850 is patterned into conductive bridges. The second conductive layer is separated from the first conductive layer by an insulating layer 860, except for at the locations 870 where contact to the first conductive layer 820 is intended. Although FIG. 10 shows the insulating layer 860 to surround only the drive electrodes 830, in practice the insulating layer 860 may cover the entirety of the first conductive layer 820, including the sense electrodes

840, being etched away only at the locations 870 where contact to the first conductive layer 820 is intended.

Figure 11:
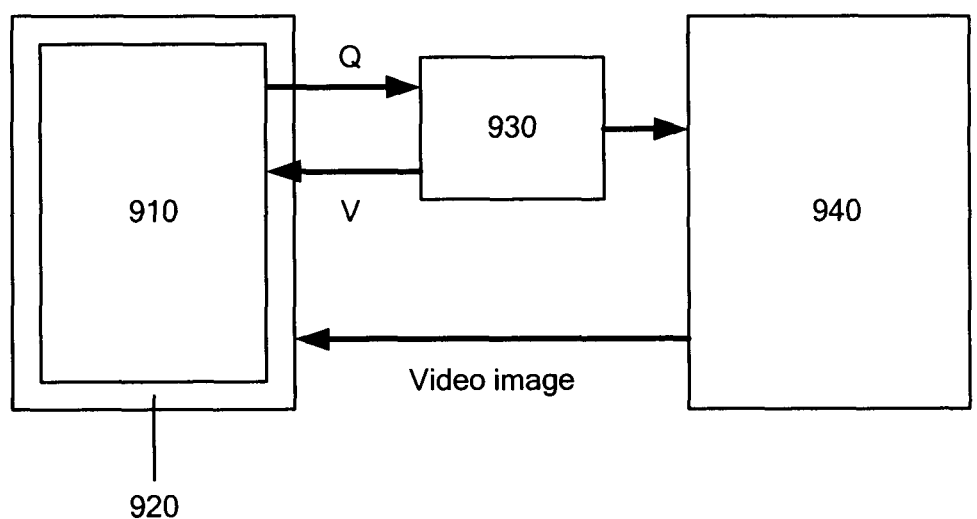
FIG. 11 shows a system that makes use of the exemplary touch sensor in accordance with the invention.

A capacitive touch panel system that employs the electrode arrangement and height sensing technique described above is shown in FIG. 11. The sensor 910 may be mounted upon a liquid crystal display device 920. Electrical connections are made between the sensor 910 and a controller circuit 930. The controller circuit issues a time varying voltage stimulus to the drive electrodes 830, whilst maintaining a constant voltage at the sense electrodes 840. The controller circuit 930 measures the charge that flows from the sense electrodes 840 in response to the voltage stimulus, as this charge is indicative of the capacitance between the drive electrodes 830 and the sense electrodes 840. The measured capacitances are then conveyed to the host electronics 940, which determine the position and height of objects above the sensor. Alternatively, the calculation of object position and height may be accomplished within the controller circuit 930, and the calculation result passed to the host electronics 940. The host electronics may generate a video image in response to detected objects, and may pass this video image to the liquid crystal display device 920.

Figure 12:
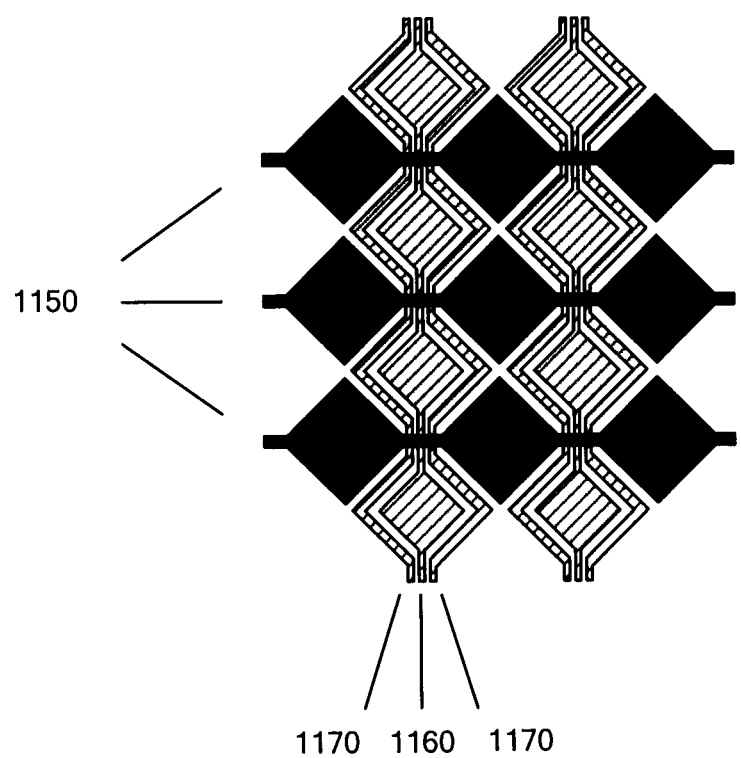
FIG. 12 shows a plan view of an exemplary electrode geometry whereby multiple drive electrodes are provided at each intersection of the sensor matrix, according to a second embodiment in accordance with the invention.

In accordance with a second embodiment of the invention, shown in FIG. 12, the electrode array includes a plurality of drive electrodes and sense electrodes in which the drive electrodes are arranged in pairs such that two drive electrodes are provided at every intersection in the array (e.g., at each row-column intersection there is formed a second electrode group that includes at least two drive electrodes and at least one sense electrode). Each drive electrode pair includes a first drive electrode, drive electrode A 1170, and a second drive electrode, drive electrode B. Drive electrode B 1160 may have a diamond geometry, while drive electrode A 1170 may be split into two halves that run either side of drive electrode B 1160. The electrode arrangement may be symmetrical around the centre line of drive electrode B. In this way, drive electrode B 1160 is more distant from each sense electrode than drive electrode A 1170. In this way, the mutual coupling capacitor between drive electrode A and the sense electrode is similar to the capacitance CA above and the mutual coupling capacitor between drive electrode B and the sense electrode is similar to the capacitance CB.

Figure 13:
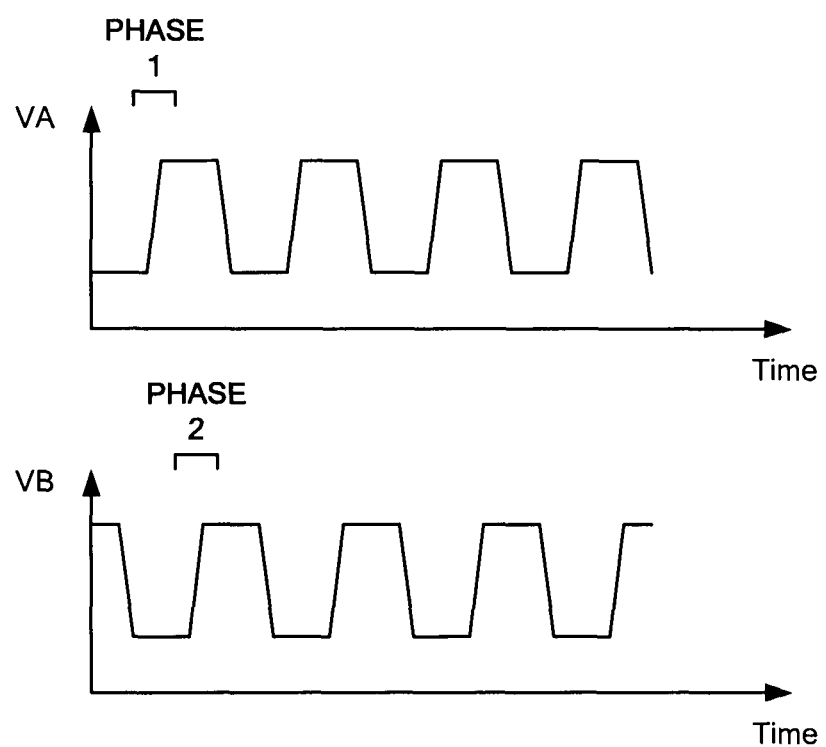
FIG. 13 shows one possible timing diagram for operation of the exemplary sensor according to the second embodiment.

This second embodiment is operated in two distinct phases, as shown in FIG. 13. In a first phase, drive electrode A is excited with a changing electric potential (VA), and drive electrode B is held at a constant electric potential (VB), whilst the charge that flows from each sense electrode 1150 is measured. In a second phase, drive electrode A is held at a constant electric potential, and drive electrode B is excited with a changing electric potential, whilst the charge that flows from each sense electrode 1150 is again measured. Accordingly, by comparing measurement results from the first and second phase it is possible to determine the height of an object independently of its size, conductivity and resistance to ground.

Figure 14:
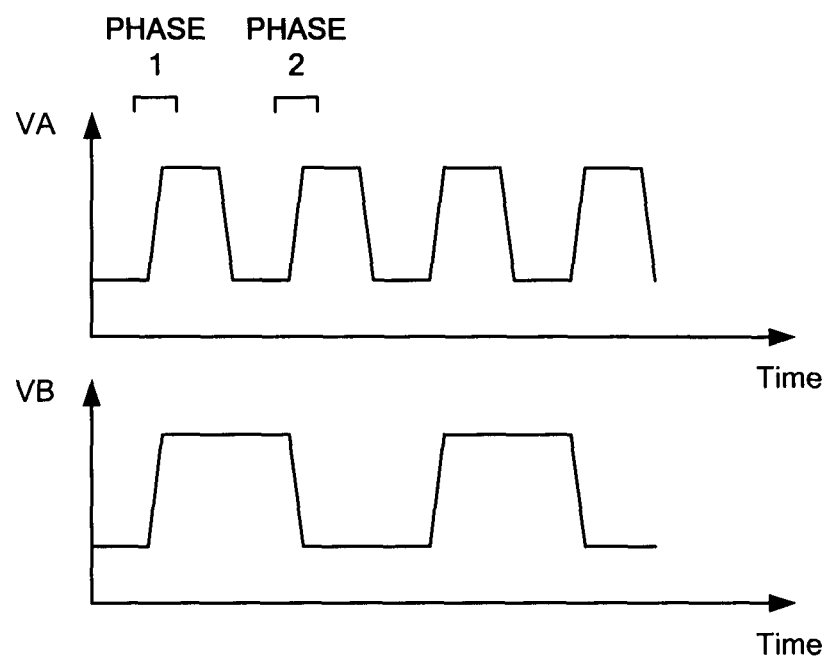
FIG. 14 shows another possible timing diagram for operation of the exemplary sensor according to a third embodiment.

A third embodiment of the invention shares an identical electrode geometry to the second embodiment, yet is operated in an alternative two phase operation. FIG. 14 shows the voltage applied to drive electrode A (VA) and the voltage applied to drive electrode B (VB). In the first phase, a positive voltage change is issued to both drive electrode A and drive electrode B. In the second phase, a positive voltage change is applied to drive electrode A, whilst a negative voltage change is issued to drive electrode B. The measured charge that flows from the sense electrode during the first phase is therefore indicative of the sum of the two drive to sense capacitances, whilst the measured charge that flows from the sense electrode during the second phase is indicative of the difference between the two drive to sense capacitances. This embodiment may be advantageous over the previous embodiment, as the signal to noise ratio is expected to be improved.

Figure 15:
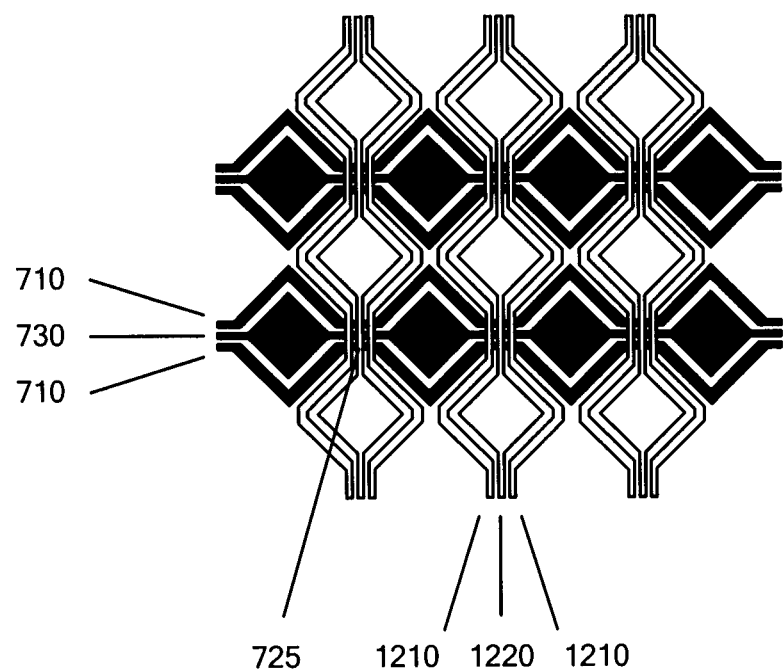
FIG. 15 shows a plan view of an exemplary electrode geometry whereby multiple drive and sense electrodes are provided at each intersection of the sensor matrix, according to a fourth embodiment.

In accordance with a fourth embodiment of the invention, the electrode array comprises a plurality of drive electrodes and sense electrodes arranged as drive electrode pairs and sense electrode pairs. FIG. 15 shows a plan view of the electrode geometry according to this embodiment. As with the first embodiment, the sense electrode pair includes a first sense electrode, sense electrode A, and a second sense electrode, sense electrode B. Sense electrode A 710 is split into two halves, which run to either side of sense electrode B 730. In addition, the drive electrode pair includes a first drive electrode, drive electrode A 1210, and a second drive electrode, drive electrode B 1220. As described in the second embodiment, drive electrode A is split into two halves, which run to either side of drive electrode B 1220.

Figure 16:
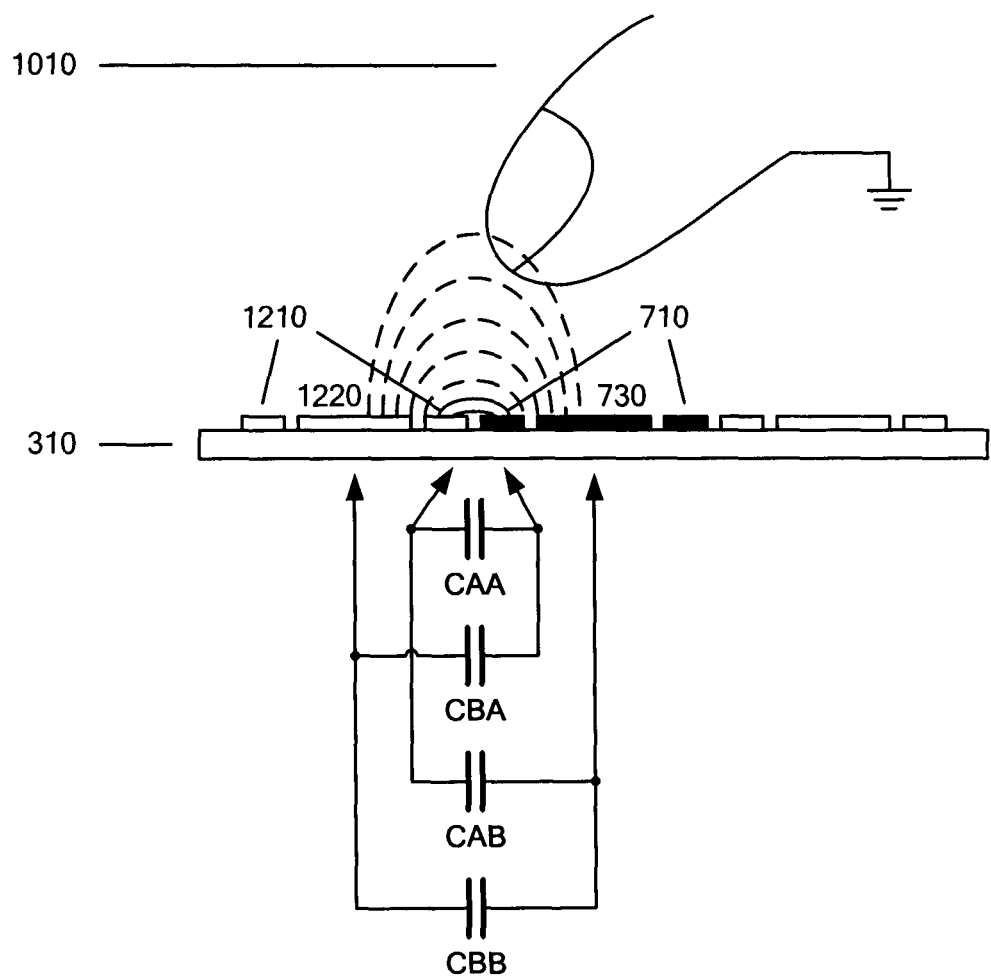
FIG. 16 shows a cross section of an exemplary sensor substrate, according to the fourth embodiment, showing electric field lines coupling between the drive and sense electrodes, in the case where two drive electrodes and two sense electrodes are provided at each intersection.

FIG. 16 is shows a cross-section of the sensor substrate 310, through a drive-sense intersection 725. FIG. 16 shows a drive electrode pair that includes drive electrode A 1210 and drive electrode B 1220 and an adjacent sense electrode pair including sense electrode A 710 and sense electrode B 730. Each electrode in the drive electrode pair forms a mutual coupling capacitor with each electrode in the sense electrode pair. One half of drive electrode A 1210 is positioned close to one half of sense electrode 710, in the plane of the sensor substrate. These electrodes are positioned between the drive electrode B 1220 and the sense electrode B 730. The mutual coupling capacitor between drive electrode A and sense electrode A is therefore formed over a shorter distance than that between drive electrode B and sense electrode B.

This electrode array may be operated in two distinct phases. In a first phase, a voltage stimulus (changing electric potential) is applied to drive electrode A and drive electrode B is held at a constant electric potential. The charge that flows from sense electrode A and the charge that flows from sense electrode B in response to this stimulus are measured. In a second phase, drive electrode A is held at a constant electric potential whilst a voltage stimulus is applied to drive electrode B. Again, the charge that flows from each sense electrode is measured. Four capacitances may therefore be determined from these measurements: capacitance CAA, which couples drive electrode A 1210 to sense electrode A 710, capacitance CBB, which couples drive electrode B 1220 to sense electrode B 730, capacitance CAB, which couples drive electrode B 1220 to sense electrode A 710, and capacitance CBA, which couples drive electrode A 1210 to sense electrode B 730. Object height may be obtained using two or more of these capacitances, for example by taking the ratio of CAA/CBB, as described in the first embodiment. This fourth embodiment may be advantageous over the previous embodiments, because the distances over which coupling capacitances CAA and CBB are formed are more diverse than in the first embodiment.

A fifth embodiment of the invention uses the same electrode geometry as the fourth embodiment. However, the fifth embodiment in operated in a single phase, during which a positive change in electric potential is applied to drive electrode A, and a negative change in electrode potential is applied to drive electrode B. By measuring the charge that flows from sense electrode A it is possible to determine the quantity (CAA-CBA), and by measuring the charge that flows from sense electrode B it is possible to determine the quantity (CAB-CBB). The ratio of these quantities may be used to determine object height in a manner similar to that previously described. This embodiment is advantageous because, by optimizing the size of drive electrode A compared to drive electrode B, and the magnitude of the stimulus applied to drive electrode A compared to that applied to drive electrode B, it is possible to minimise the external electric fields present during operation.

Figure 17:
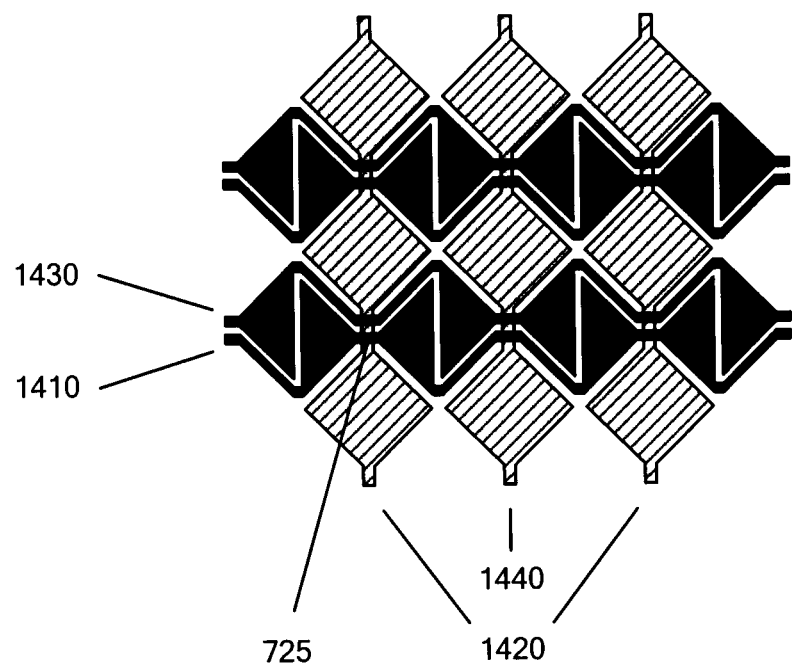
FIG. 17 shows another exemplary electrode geometry, in accordance with a sixth embodiment, whereby the roles of the first and second sense electrodes are dynamically allocated depending upon the drive electrode that is excited.

In accordance with a sixth embodiment of the invention, an electrode array includes a sense electrode pair formed by a first and second dual-function electrode as described in co-pending U.S. application Ser. No. 13/435,898 filed on Mar. 30, 2012, which is herein incorporated in full by reference. As shown in FIG. 17, the majority of the area of the first dual-function electrode, sense electrode A 1410, approaches the odd numbered drive electrodes 1420 closely, while the majority of the area of second dual-function electrode, sense electrode B 1430, approaches the even numbered drive electrodes 1440 closely. Therefore, when one of the odd numbered drive electrodes 1420 is excited, it forms a coupling capacitance to sense electrode A 1410 over a short distance, and a coupling capacitance to sense electrode B 1430 over a longer distance, and the ratio of the change in the drive to sense capacitances, CA/CB, may be examined in order to determine object height. However, when one of the even numbered drive electrodes 1440 is excited, it forms a coupling capacitance to sense electrode B 1430 over a short distance, and a coupling capacitance to sense electrode A 1410 over a longer distance, and so the ratio of the change in the drive to sense capacitances, CB/CA, should be examined instead. This embodiment may be advantageous over the previous embodiments because the two sense electrodes are similar in their series resistance and capacitance to ground.

Figure 18:
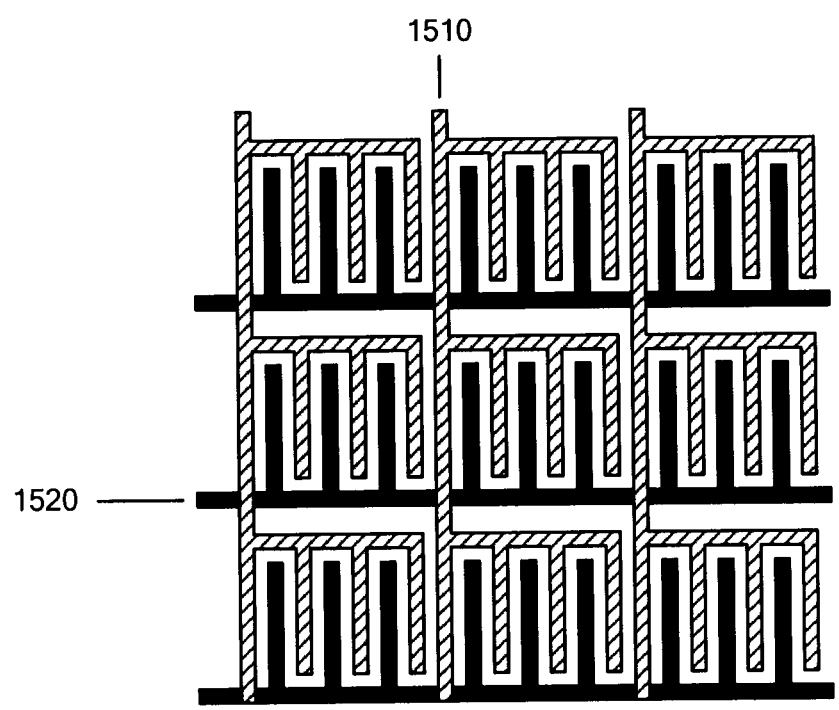
FIG. 18 shows a conventional sensor matrix having a pattern of interdigitated drive and sense electrodes.
Figure 19:
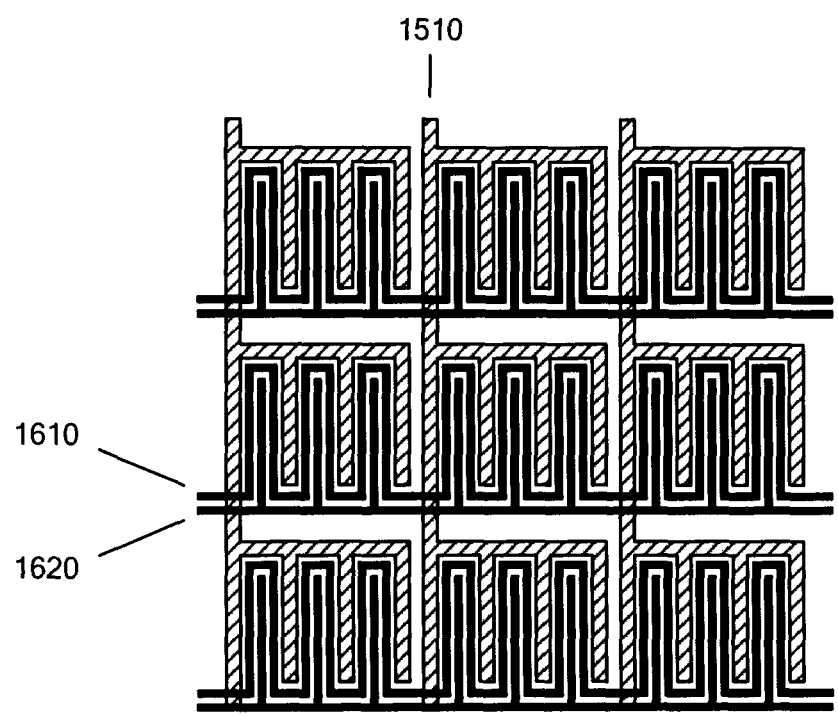
FIG. 19 shows application of the present invention to a sensor matrix having interdigitated drive and sense electrodes.

In accordance with a seventh embodiment of the invention, the drive and sense electrodes are interdigitated. In a conventional touch sensor, these interdigitated electrodes may appear as shown in FIG. 18, where drive electrodes 1510 tessellate with sense electrodes 1520. The present invention may be applied to this conventional geometry in the manner shown in FIG. 19, where sense electrode A 1610 runs between sense electrode B 1620 and the interdigitated drive electrode 1510. This embodiment may be advantageous over the previous embodiments because the interdigitated geometry provides a larger fringing capacitance between the drive and sense electrodes, and therefore a greater signal swing.

An eighth embodiment uses any one of the electrode geometries described in the previous embodiments. Like the previous embodiments, the ratio of the two measured capacitances is used to determine the height of an object in proximity to the sensor, and this ratio is compared to a look-up table in order to determine object height. However, in the eighth embodiment, a different look-up table is used for each intersection of the sensor matrix. This embodiment may be advantageous when the response of each intersection differs, for example due to edge effects close to the extremities of the sensor substrate.

Figure 20:
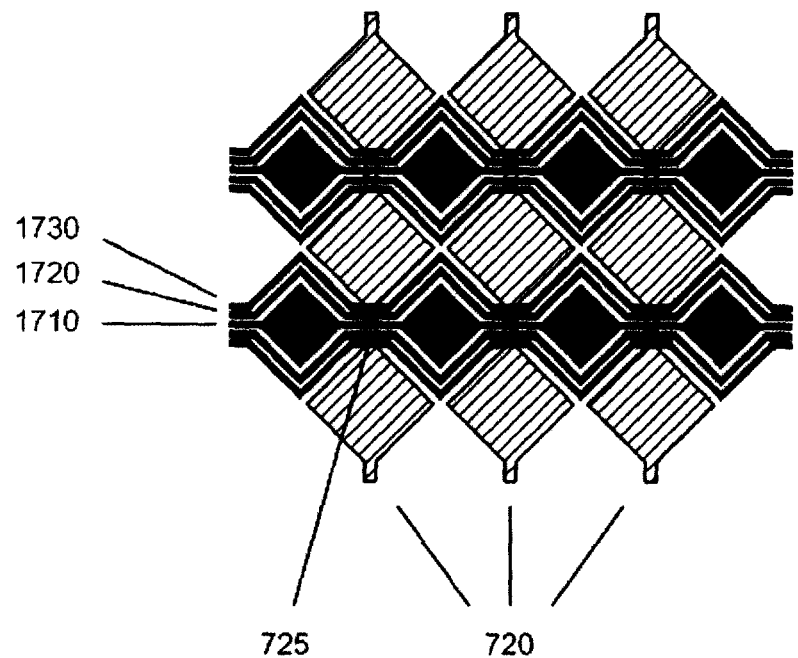
FIG. 20 shows another exemplary electrode geometry in accordance with a ninth embodiment, which has three sense electrodes at each location of the matrix.

In accordance with a ninth embodiment of the invention, more than two sense electrodes are present at each intersection of the sensor matrix. FIG. 20 shows an electrode geometry that has three sense electrodes at each intersection 725. A first diamond shaped sense electrode 1710 is surrounded on either side by a second electrode track 1720. The first diamond shaped sense electrode 1710 and the second electrode track 1720 are in turn surrounded on either side by a third electrode track 1730. Three capacitances are therefore measured when driving one of the drive electrodes 720. One capacitance corresponds to the coupling from the drive electrode to each of the three sense electrodes. The three capacitances change to different extents when a conductive object approaches the sensor, and these changes can be used to determine the proximity of the object to the sensor substrate. One way of doing this is to measure the ratio of the change in the second capacitance to the change in the first capacitance, and likewise the ratio of the change in the third capacitance to the change in the first capacitance. These two ratios may now be compared to a lookup table, which contains predetermined ratios recorded at various object proximities. This ninth embodiment may be advantageous over the previous embodiments, because having multiple sense electrodes at each intersection may yield a more robust measure of object height than having only two sense electrodes at each location.

Figure 21:
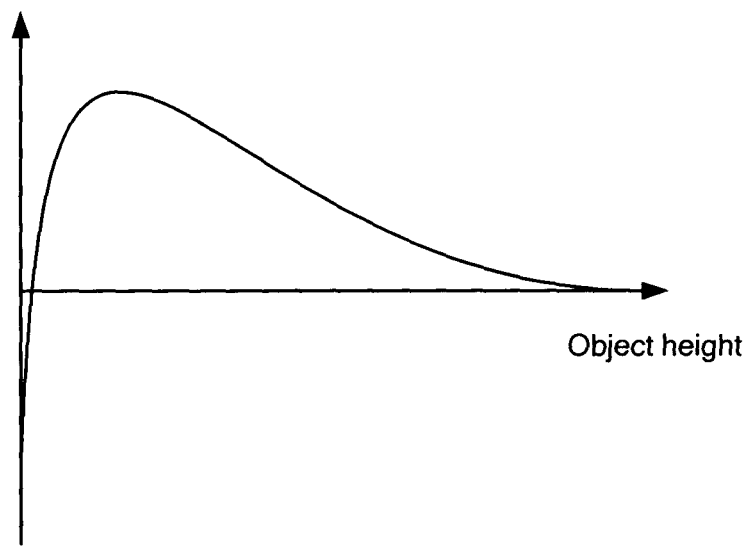
FIG. 21 shows a possible variation of the quantity CA–CB with object height.

A tenth embodiment uses the same electrode geometry as the first or fifth embodiments. However, instead of taking the ratio of the capacitances CA and CB, a subtraction is used to determine object height. Depending on the exact electrode geometry, the quantity CA−CB may behave in the manner shown in FIG. 21, whereby an inversion of the quantity or of its gradient is seen as the object comes into very close proximity with the sensor substrate. This subtraction may also be weighted, for example by evaluating CA−X CB, where X is a multiplicative weighting factor. The weighting factor may be determined empirically so that the subtraction provides the greatest possible signal to noise ratio for proximity measurements, whilst still providing adequate indication of object height.

Figure 22:
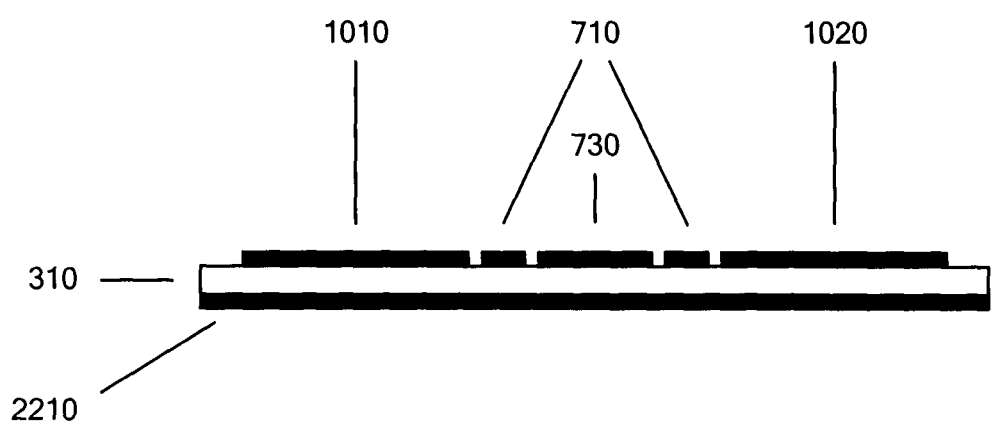
FIG. 22 shows a cross section of a sensor substrate positioned above the common electrode of a liquid crystal display.

When a subtraction is performed in this manner, it may be possible to cancel some or all of the electrical interference that couples coherently to the two sense electrodes. For example, as shown in FIG. 22, the dominant source of electrical interference may be a common electrode 2210 associated with a liquid crystal display, which lies uniformly beneath the sensor substrate 310. The common electrode will form parallel plate capacitances to sense electrode A 710 and sense electrode B 730 through the sensor substrate 310. The ratio of these parallel plate capacitances will be determined by the area of the two sense electrodes. Based on this capacitance ratio, the multiplicative weighting factor, X, may be chosen so that some or all of the electrical interference is cancelled by the subtraction of CA−X CB. For example, when X=1, coherent interference may be substantially cancelled by designing the two sense electrodes to have equal capacitances to the common electrode 2210. Therefore the tenth embodiment is advantageous in that it may be used to substantially improve the signal to noise ratio of the sensor.

An eleventh embodiment uses the same electrode geometry as the fourth embodiment and, like the fourth embodiment, is operated in two phases to measure four different capacitances. In the first phase, the capacitances CAA and CAB are measured, whereas in the second phase, the capacitances CBA and CBB are measured. However, rather than calculating a ratio of the measured capacitances, a weighted summation (or subtraction) of the measured capacitances may be used to determine the proximity of an approaching object. For example, the result of (CAA−CAB)+(CBA−CBB) will be dependent upon object proximity yet will cancel noise that couples coherently to the two sense electrodes, in the manner previously described. This eleventh embodiment may be advantageous over the fifth embodiment, in that the signal to noise ratio of the sensor may be significantly higher, due to noise cancellation.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The invention finds application in touch panels and touch-screen devices, for industrial and consumer electronics. It is ideally suited to products such as mobile phones, tablet computers and 'e-readers'.

What is claimed is:

1. A capacitive touch sensor, comprising:
a sensor substrate;
an array of electrode elements formed over the sensor substrate, each electrode element of the array including at least one of
a first electrode group comprising at least two drive electrodes and at least one sense electrode, or
a second electrode group comprising at least two sense electrodes and at least one drive electrode,
wherein the respective electrodes of the first or second electrode group are arranged to form multiple capacitances over different coupling distances, so that the field lines from the respective electrodes spread with different density at different heights with respect to the sensing plane; and
a controller operatively coupled to the array of electrode elements, the controller configured to measure a distance of an object relative to and perpendicular from a plane defined by the surface of the touch sensor based on independent measurement of the extent to which a drive signal, applied to at least one of the drive electrodes, is received by at least one of the sense electrodes, via at least two of the multiple capacitances of different coupling distances.

2. The touch sensor according to claim 1, wherein the electrode elements of the array comprise the second electrode group, and within the second electrode group a first sense electrode of the at least two sense electrodes is separated from the at least one drive electrode by a shorter distance, in a plane of the sensor substrate, than a second sense electrode of the at least two sense electrodes.

3. The touch sensor according to claim 2, wherein the first and second sense electrodes are arranged symmetrically.

4. The touch sensor according to claim 2, wherein the second sense electrode is patterned into interconnected diamonds, and the first sense electrode is split into a first part and a second part, the first and second parts arranged on respective sides of the second sense electrode such that the first sense electrode is closer to the at least one drive electrode than the second sense electrode.

5. The touch sensor according to claim 4, wherein the first part and the second part are electrically connected to each other.

6. The touch sensor according to claim 2, wherein the first sense electrode forms a first mutual coupling capacitance with the at least one drive electrode and the second sense electrode forms a second mutual coupling capacitance with the at least one drive electrode.

7. The touch sensor according claim 2, wherein a majority of the first sense electrode is separated from a first drive electrode of the respective electrode element by a shorter distance, in a plane of the sensor substrate, than the second sense electrode of the respective electrode element, and a majority of the second sense electrode is separated from a second drive electrode of an adjacent electrode element by a shorter distance, in a plane of the sensor substrate, than the first sense electrode.

8. The touch sensor according to claim 1, wherein the controller is configured to calculate a distance of an object relative to a planar surface of the touch panel based on a ratio of the changes in the drive to sense capacitances, said distance measured perpendicularly to the planar surface of the touch panel.

9. The touch sensor according to claim 1, wherein the electrode elements of the array comprise the first electrode group, and within the first electrode group a first drive electrode of the at least two drive electrodes is separated from the at least one sense electrode by a shorter distance, in a plane of the sensor substrate, than a second drive electrode of the at least two drive electrodes.

10. The touch sensor according to claim 9, wherein the at least two drive electrodes are arranged symmetrically.

11. The touch sensor according to claim 9, wherein the second drive electrode is patterned into interconnected diamonds, and the first drive electrode is split into a first part and a second part, the first part arranged on each side of the second drive electrode such that the first part is closer to the at least one sense electrode than the second drive electrode.

12. The touch sensor according to claim 9, wherein the first drive electrode forms a first mutual coupling capacitance with the at least one sense electrode and the second drive electrode forms a second mutual coupling capacitance with the at least one sense electrode.

13. The touch sensor according to claim 1, wherein the first or second electrode group comprises at least two drive electrodes arranged as drive electrode pairs and at least two sense electrodes arranged as sense electrode pairs, and
wherein one drive electrode of the drive electrode pair is split into first and second drive electrode parts and one sense electrode of the sense electrode pair is split into first and second sense electrode parts, and
the first drive electrode part is positioned adjacent to the first sense electrode part in a plane of the sensor substrate, and the first drive electrode part and the first sense electrode part are arranged between the second drive electrode part and the second sense electrode part.

14. The touch sensor according to claim 1, wherein the drive electrodes are interdigitated with the sense electrodes.

15. The touch sensor according to claim 1, wherein the controller is configured to access a look-up table corresponding to each electrode element in order to determine a position and distance of an object relative to the touch panel.

16. The touch sensor according to claim 1, wherein the first or second electrode group comprises three or more sense electrodes.

17. A capacitive touch panel system, comprising
a liquid crystal display; and
the touch sensor according to claim 1 mounted to the liquid crystal display.

18. The touch panel system according to claim 17, wherein the controller is configured to:
provide a time varying voltage stimulus to the drive electrodes; and
measure a charge that flows from the sense electrodes in response to the time varying voltage stimulus.

19. The touch panel system according to claim 18, wherein the controller is further configured to determine a position and height of an object above the touch sensor based on the measured charge.

20. The touch panel system according to claim 18, wherein the controller is configured to:
perform a first measurement phase wherein a charge is measured that flows from each sense electrode in response to the first drive electrode being provided with a changing electric potential while the second drive electrode is held at a constant electric potential;
perform a second measurement phase wherein a charge is measured that flows from each sense electrode in response to the second drive electrode being provided with a changing electric potential while the first drive electrode is held at a constant electric potential; and
determine a position and distance of an object from the touch panel based on the measured charge obtained in the first and second measurement phases.

21. The touch panel system according to claim 18, wherein the controller is configured to:
perform a first measurement phase wherein a charge is measured that flows from each sense electrode in response to a positive voltage change provided to both the first drive electrode and the second drive electrode;
perform a second measurement phase wherein a charge is measured that flows from each sense electrode in response to a positive voltage change provided to the first drive electrode, while a negative voltage change is provided to the second drive electrode; and
determine a position and distance of an object from the touch panel based on the measured charge obtained in the first and second measurement phases.

22. The touch panel system according to claim 18, wherein the controller is configured to:
perform a first measurement phase wherein a charge is measured that flows from the first sense electrode and from the second sense electrode in response to a voltage stimulus applied to the first drive electrode while the second drive electrode is held at a constant electric potential;
perform a second measurement phase wherein a charge is measured that flows from the first sense electrode and the second sense electrode in response to a voltage stimulus applied to the second drive electrode while the first drive electrode is held at a constant electric potential;
determine a position and distance of an object from the touch panel based on the measured charge of the first and second sense electrodes obtained in the first and second measurement phases.

23. The touch panel system according to claim 18, wherein the controller is configured to:
perform a first measurement phase wherein a charge is measured that flows from the first sense electrode and from the second sense electrode in response to a positive change in electric potential applied to the first drive electrode and a negative change in electric potential is applied to the second drive electrode;
determine a position and distance of an object from the touch panel based on the measured charge of the first and second sense electrodes.

24. The touch panel system according to claim 18, wherein the controller is configured to:
determine a first capacitance between the drive electrode and a first sense electrode of the three sense electrodes;
determine a second capacitance between the drive electrode and a second sense electrode of the three sense electrodes;
determine a third capacitance between the drive electrode and a third sense electrode of the three sense electrodes;
determine the ratio of the change in the second capacitance to the change in the first capacitance;
determine the ratio of the change in the third capacitance to the change in the first capacitance;
compare the ratios to data stored in a lookup table; and
determine a position and distance of an object from the touch panel based on the comparison.

25. The touch panel system according to claim 18, wherein the controller is configured to determine a position and distance of an object from the touch panel based on a ratio of measured capacitance between the drive and sense electrodes.

26. The touch panel system according to claim 18, wherein the controller is configured to determine a position and distance of an object from the touch panel based on a difference in measured capacitance between the drive and sense electrodes.

27. The touch panel system according to claim 26, wherein the controller is further configured to apply a weight factor to at least one measured capacitance prior to determining the difference in capacitance.

28. The touch panel system according to claim 18, wherein the controller is configured to:
perform a first measurement phase wherein a charge is measured that flows from the first sense electrode and from the second sense electrode in response to a voltage stimulus applied to the first drive electrode while the second drive electrode is held at a constant electric potential;
perform a second measurement phase wherein a charge is measured that flows from the first sense electrode and the second sense electrode in response to a voltage stimulus applied to the second drive electrode while the first drive electrode is held at a constant electric potential;
determine a position and distance of an object from the touch panel based on a weighted summation of the measured charge of the first and second sense electrodes obtained in the first and second measurement phases.

29. The touch sensor according to claim 1, wherein the controller configured to measure the distance of the object relative to and perpendicular from the plane defined by the surface of the touch sensor based on independent and simultaneous measurement of the extent to which a drive signal, applied to at least one of the drive electrodes, is received by at least one of the sense electrodes, via at least two of the multiple capacitances of different coupling distances.

* * * * *